Aug. 23, 1932.   W. C. PITTER   1,873,633
INTERMITTENT CLUTCH
Filed Dec. 4, 1930
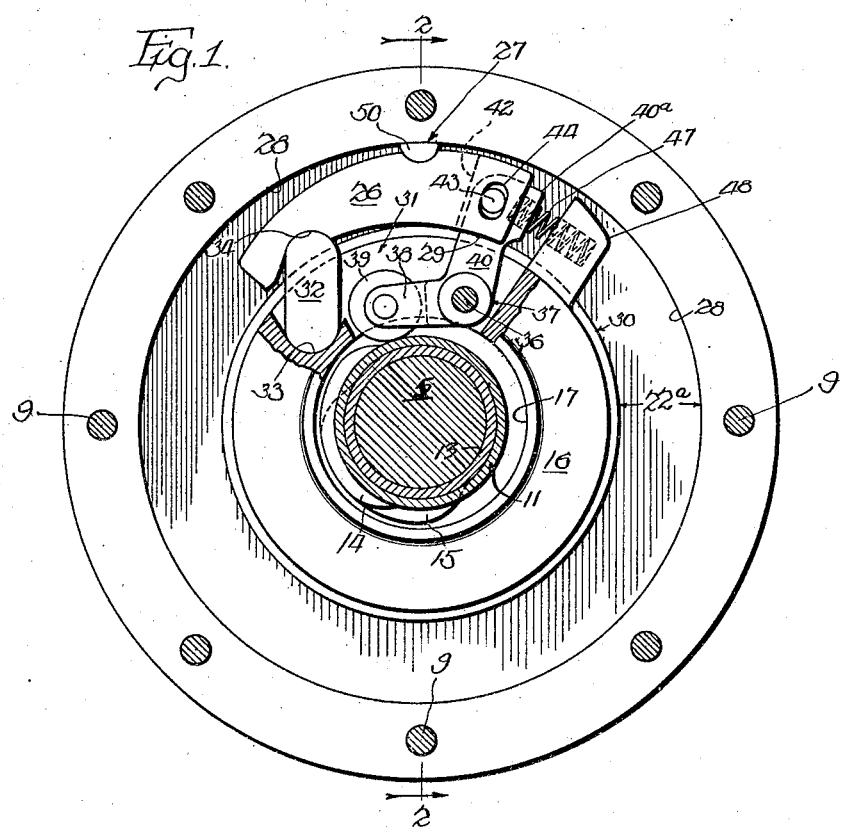
Fig.1.
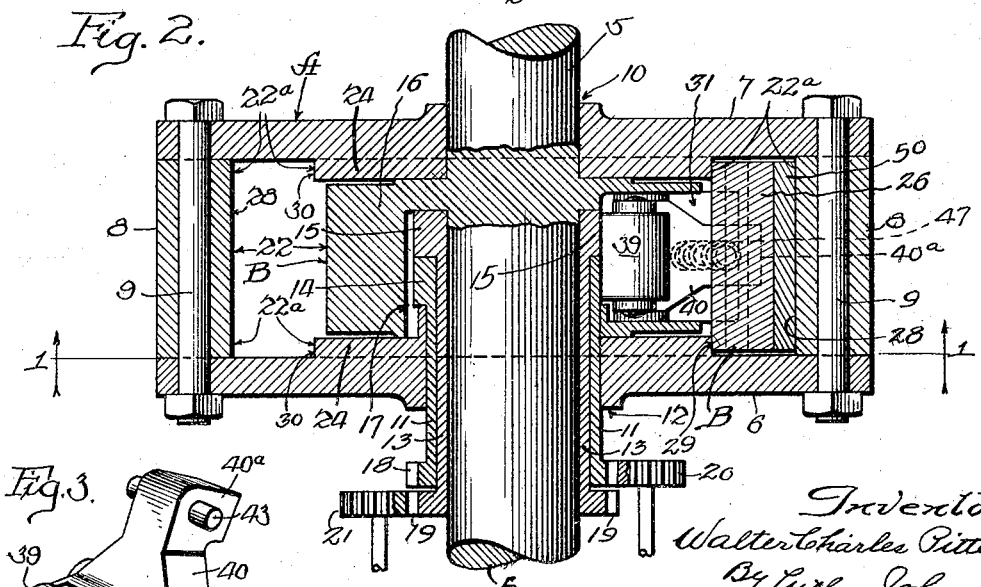
Fig.2.
Fig.3.
Inventor
Walter Charles Pitter
By Luther Johns
atty.

Patented Aug. 23, 1932

1,873,633

UNITED STATES PATENT OFFICE

WALTER CHARLES PITTER, OF EPPING, ENGLAND, ASSIGNOR TO THE PITTER TRUST, OF CHICAGO, ILLINOIS, A COMMON LAW TRUST

INTERMITTENT CLUTCH

Application filed December 4, 1930. Serial No. 499,890.

These improvements relate to means for deriving an intermittent rotative movement from a continuous rotative movement.

The prime objects are to accomplish that result by simple means, by means which may be embodied as a small and compact unit, and which operate effectively and reliably. It is an object to provide features of adjustability whereby the timing and the periods of the respective intermittent movements may be varied. Other objects and advantages will appear hereinafter.

In the drawing Figure 1 is an elevation of the principal interior parts and a section of the shaft and sleeve members, on the line 1—1 of Fig. 2;

Fig. 2 is a sectional view on the line 2—2 of Fig. 1, with a roller in advance of the section line shown in full; and Fig. 3 is a perspective view of one of the details.

On shaft 5 is a cylindrical hollow frame or housing clutch member A comprising the front wall 6, the rear wall 7 and the peripheral ring 8, through all of which parts pass bolts 9. This housing may turn freely on shaft 5 at bearing 10 and on sleeve 11 at bearing 12.

Inner clutch member B comprises first a hub 16 rigid with shaft 5, and which is shown integral therewith. The hub is cylindrically and coaxially recessed at 17 to accommodate sleeves 11 and 13 and their respective integral cams 14 and 15. Sleeve 13 turns on the shaft and sleeve 11 turns on sleeve 13. Means for turning the sleeves relative to each other and to vary their respective or combined orientation are shown as gears 18 and 19 on the sleeves 11 and 12 respectively and meshing with the respective gears 20 and 21 which may be turned by hand or by any suitable timing mechanism should it be desired to provide a constantly varying operation of the cams.

Member A has an annular channel 22 the effective parts of which are at the spaces 22a defined by annular ring 8 on the outer side and by the enlargements 24 of the walls 6 and 7 on the inner side.

In recess 22 is an elongated clutch element 26 having an outer surface at 27 adapted to bind against inner wall 28 of member A and an inner surface 29 radially offset and forward of surface 27 adapted to bind against the surfaces 30 of the lateral annular spaces 22a.

Hub 16 has a large recess 31, at one end of which is a strut 32 seated at 33 in the hub and at 34 in the clutch element 26. If the hub were turned clockwise as viewed in Fig. 1, it would force the rear end of clutch lever 26 outward, since strut 32 is somewhat tangentially arranged, causing the surfaces at 27 and 29 to bind against the opposite surfaces of the spaces 22a. The effect of this is to clutch the inner and outer members together and drive the outer member.

In recess 31 there is a bell crank lever marked as a whole 37 pivoted for rocking movements on the pin 36. It has one arm 38 on which is mounted a roller 39 which, as to be seen in Fig. 2, is wide enough to cover both of the cams 14 and 15. The other arm 40 of the bell crank has a relatively narrow end 40a which fits into a recess 42 in the front end of clutch element 26. A pin 43 is rigid with part 40a and extends into an elongated opening 44 in clutch element 26, which allows for necessary play at the front end of element 26. A compression spring 47 operates against the end 40a and against the stop or support 48 integral with hub 16.

Spring 47 forces clutch element 26 to the left as viewed in Fig. 1, in which position it is ready to bind the inner and outer members together.

Should roller 39 be moved radially outward clutch member 26 would be moved bodily to the right as viewed in Fig. 1, which would swing the upper part of strut 32 to the right and also slightly inward. The entire clutching mechanism would then be in what may be termed its collapsed or non-clutching position, and the clutching action would not take place.

If we consider the hub to be continuously rotating in the clockwise direction in Fig. 1 the clutching action will be interrupted whenever roller 39 is moved outward, and the clutching action will again take place when roller 39 is permitted to move inward.

The outward movement of roller 39 is controlled by the cams 14 and 15. The roller 39 is revolving around these cams. According to the arrangement in Fig. 1 roller 39 would first engage cam 15 to discontinue the clutching action. In the arrangement shown cam 14 coacts with cam 15 in extending the time period during which the clutch is held out of operation. Cam 14 could be turned, by means of gears 18 and 20, so as to coincide with cam 15, in which event the time interval during which the clutch is out of operation would be limited to the circumferential length of either cam 14 or 15, the two then operating merely as one cam of the length of either of them. The cams could be turned somewhat farther apart as shown, or could be brought into more fully overlapped relation, varying the time interval of the declutch.

These cams can also be moved around into various other positions, for example directly opposite the positions illustrated, in which event the declutching operation would be immediately started. Such orientation of the cams 14 and 15 will vary the operation of the outer or driven member, making it start earlier or later relative to some other operation governed by the rotation of the shaft.

It may be desirable to move the outer member several times during one revolution of the inner member. This can be accomplished by separating the cams 14 and 15 so that there will be two clutching and two declutching operations with each revolution of the driving shaft.

The clutch illustrated, disregarding the declutching feature herein shown, is described and claimed, as to its essential or characteristic features, in my copending application Serial No. 293,593 of July 18, 1928. That clutch mechanism is peculiarly appropriate for use in the present connection since its action is very positive and highly reliable.

The part marked 50 at the top of Fig. 1 is a metal shoe or insert which may move freely in its recess to accommodate itself to the surface 28 against which it bears. That feature is also described and claimed in my said copending application.

I contemplate as being included in these improvements all such changes, variations and departures from what is thus specifically illustrated and described as fall within the scope of the appended claims.

I claim:

1. A clutch mechanism having rotary coaxial driving and driven members with an annular channel between them, comprising an elongated clutch element tiltable in said channel, means movably carried by one of said members and pivotally engaging the clutch element adjacent one end thereof to move it to operative position in the channel, means movable relatively to the same member and engaging the clutch element adjacent the opposite end for moving the clutch element to inoperative position in the channel, and means for controlling the action of one of the aforesaid means.

2. A clutch mechanism having rotary coaxial driving and driven members with an annular channel between them, comprising an elongated clutch element tiltable in said channel, a compression element carried by one of said members and pivotally engaging the clutch element adjacent one end thereof to move it to operative position in the channel, means movable relatively to the same member and engaging the clutch element adjacent the opposite end for moving the clutch element to inoperative position in the channel, and means for controlling the actuation of the last named means.

3. A clutch mechanism having rotary coaxial driving and driven members with an annular channel between them comprising an elongated clutch element tiltable in said channel, a strut pivotally carried by one of said members and pivotally engaging the clutch element adjacent one end thereof and adapted to move it to operative position in the channel upon rotation of said member relatively to the other member, means movable relatively to the same member and engaging the clutch element adjacent the opposite end for moving the clutch element to inoperative position in the channel, and means for controlling the actuation of the last named means.

4. A clutch mechanism having rotary coaxial driving and driven members with an annular channel between them, an elongated clutch element tiltable in said channel, means movably carried by one of said members and pivotally engaging the clutch element adjacent one end thereof to move it to operative position in the channel, a bell crank carried by the same member and engaging the clutch element adjacent the opposite end and adapted to move the clutch element to inoperative position in the channel, and means for controlling the actuation of said bell crank.

5. A clutch mechanism having rotary coaxial driving and driven members with an annular channel between them, comprising an elongated clutch element tiltable and slidable in said channel, a strut pivotally carried by one of said elements and pivotally engaging the clutch element adjacent one end thereof, and adapted to move the clutch element to operative position in the channel upon rotation of said member relatively to the other member, a bell crank carried by the same member and pivotally and slidably connected to the opposite end of the clutch element, a spring between said member and said bell crank, and means for controlling the actuation of said bell crank.

6. A clutch mechanism having rotary coaxial driving and driven members with an annular channel between them, an elongated clutch element tiltable in said channel, a pair of control elements carried movably by one of said members for variably engaging the clutch element adjacent opposite ends respectively, and adapted to move said clutch element to operative and inoperative relation in the channel respectively, and means for controlling one of said control elements selectively for effecting the movement of the clutch element to operative and inoperative position.

7. A clutch mechanism having rotary coaxial driving and driven members with an annular channel between them, an elongated clutch element tiltable in said channel, a pair of control elements carried by one of said members and engaging opposite ends of the clutch element respectively, means for actuating periodically one of said control elements, one of said control elements being adapted to tilt the clutch element to operative position in the channel when the carrying member is being rotated relatively to the other member, and the other of said control elements being adapted to move the clutch element to inoperative position when said member carried element is being actuated.

8. A clutch mechanism having rotary coaxial driving and driven members with an annular channel between them, an elongated clutch element floatingly supported in said channel, and separate means carried by the driving member and engaging the clutch element adjacent opposite ends thereof respectively for intermittently rocking the floating clutch element to binding position between the two rotary members and for rocking and sliding the floating clutch element to release position between said rotary members respectively during the rotation of said members.

9. A clutch mechanism having rotary coaxial driving and driven members with an annular channel between them, an elongated clutch element loosely disposed within said channel, a pair of means movably supported by the driving member and loosely connected with the elongated clutch element adjacent opposite ends for alternately moving said clutch element to binding and release position between said rotary members, and a cam controlling one of said means for actuating the same to move the clutch element to release position.

WALTER CHARLES PITTER.